United States Patent Office 3,709,893
Patented Jan. 9, 1973

3,709,893
HYDROXYISOQUINUCLIDINE DERIVATIVES
Luigi Bernardi, Cesare Bertazzoli, and Tecla Chieli, Milan, and Paolo Maggioni, Montevecchia (Como), Italy, assignors to Societa Farmaceutici Italia, Milan, Italy
No Drawing. Filed July 30, 1970, Ser. No. 59,747
Claims priority, application Italy, July 29, 1969, 20,217/69
Int. Cl. C07d 39/00
U.S. Cl. 260—293.54                    12 Claims

ABSTRACT OF THE DISCLOSURE

Esters of 6-hydroxy and 6-hydroxyisoquinuclidines substituted in the 2-position having the formula:

wherein R is a lower alkyl or aralkyl; X and $X_1$ are different and are selected from the group consisting of hydroxy and an α-substituted phenylacetoxy radical of the formula:

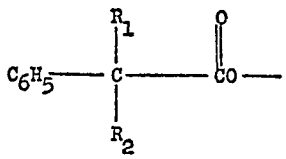

wherein $R_1$ is selected from the group consisting of hydrogen and hydroxy group; $R_2$ is selected from the group consisting of aryl and cycloalkyl. The invention includes the corresponding pharmaceutically acceptable quaternary nitrogen derivatives and salts with organic or inorganic acids, as well as the preparation thereof. The compounds are therapeutically useful.

---

Our invention relates to derivatives of hydroxyisoquinuclidine useful in therapy and to a process of the preparation thereof. More particularly, our invention relates to a new class of esters of 6-hydroxy and 6-hydroxyisoquinuclidines substituted in the 2-position having the following formula:

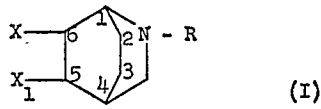

wherein R is a lower alkyl or aralkyl; X and $X_1$ are different and are selected from the group consisting of hydroxy and a α-substituted phenylacetoxy radical of the formula:

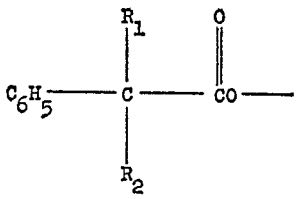

wherein $R_1$ is selected from the group consisting of hydrogen and hydroxy groups; $R_2$ is selected from the group consisting of aryl and cycloalkyl. Our invention includes the corresponding pharmaceutically acceptable quaternary nitrogen derivatives and salts with organic or inorganic acids.

The compounds can be prepared according to our invention by esterifying a compound having the above-mentioned Formula I, wherein X and $X_1$ are different and selected from the group consisting of hydrogen and hydroxyl group, with the acid chloride of the formula:

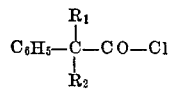

wherein $R_1$ and $R_2$ have the above-mentioned meaning.

If an α-hydroxyacid ester is desired ($R_1$=hydroxyl) the corresponding α-chloro-derivative is preferably used as starting material. A free hydroxy group is obtained by treatment of the ester obtained with an alkali metal base.

The starting products of the process of the present invention are 2-substituted 5-hydroxy or 6-hydroxy-isoquinuclidines {2-substituted 5-hydroxy or 6-hydroxy-2-azabicycle-[2,2,2]-octane} which may be prepared from the corresponding 5,6-epoxy derivatives according to the method described by J. I. DeGraw et al., J. Het. Chem. 4, 1967, pp. 251–253. The process according to the invention is initially carried out at room temperature and then completed in the warm, at a temperature of 40°–80° C., preferably in the presence of a tertiary amine. The products obtained are isolated as such in the form of free base and purified, or may be converted into the corresponding quaternary ammonium derivatives by treatment with a suitable alkyl halide or may be converted into the corresponding salts with a pharmacologically suitable organic or inorganic acid.

The products obtained by the process of the invention are in the racemic form and, if desired, may be separated in their optical antipodes in known manner. Furthermore, the esters of acids having an asymmetric carbon atoms, are a mixture of stereoisomers, which may be separated in known manner.

The products of the present invention have a high antispastic activity and a low toxicity without showing undesirable side effects. The spasmolitic activity has been tested both "in vitro" by common pharmacological methods in comparison with the atropine sulfate and oxyphenonium, one of the most potent synthetic anticholinergic drugs. The tests, "in vitro," had been carried out according to Cahen's et al. method (Therapie, 19/I, p. 375, 1964, II) as far as the dosage of the direct myolitic and anticholineargic activity is concerned and according to the method of Magnus (Arch. Ges. Physiol., 103, p. 515, 1904) as far as the direct myolitic activity against histamine is concerned. The former registers the muscular contractions (isotonic lever) of a surviving fragment of rat duodenum, in a glucosated physiological Tyrode's solution (1‰) (parts per thousand), oxygenated and maintained at 37° C. The latter was analogously employed but using a fragment of the ileum of guinea pig. The media, so prepared, had been stimulated with agonists of the smooth musculature (acetylcholine chloride, barium chloride and histamine dihydrochloride) added to the medium at a concentration so as to cause a submaximal muscular concentration. The substances under examination and the comparison ones (atropine sulfate and oxygenonium) were added to the medium half a minute before the agonist addition. The medium had been replaced after one minute from the agonist addition, whatever the result, The various stimulations had been repeated at regular intervals until the reactivity remained constant.

Under these conditions, the average effective concentration of the agonist ($EC_{50}$) was calculated, according to Miller L. C., et al., (Proc. Soc. Exp. Biol. 57, p. 261, 1944), that is the concentration able to reduce 50% of the submaximal muscular contraction caused by the agonist. The average values of at least three determinations, on three different media, are reported in Table I.

For the tests, "invo," Glasser's method (Farmaco Ed. Pr. XIV, No. 3, 1959, p. 187) was effected on the rat. This method utilizes the protective action towards the peristaltic stimulations induced by carbachol (carbamylcholine chloride) in the rat. The animals were treated with the substance under examination and after 30 or 60 minutes (according to which substance had been administered by subcutaneous route or by oral route) they were simultaneously treated with the cholinergic substance (1 mg./kg. subcutaneously) and with a bolus of vegetable charcoal (10 mg./0.1 ml. of 5% acacia gum per rat). After an additional 45 minutes, the rats are killed and examined to control the progression of the charcoal into the digestive tract. In the normal animals, generally, the most advanced part of the charcoal charge never exceeds the ileum-caecal valve. From 90 to 100% of the rats treated only with the cholinergic substance, however, showed some charcoal in the blind intestine. In the animals pretreated with the substance under examination the results obtained are the same as those of the normal rats. According to this method, it is possible to calculate the average effective dose ($ED_{50}$) that is the dose sufficient to prevent the charcoal passage beyond the ileum-caecal valve in 50% of the treated animals. Table I reports the $ED_{50}$ obtained with different gradual doses each tested on at least 10 subjects per dose and calculated by the probits method (Finney D. J. Probit Analysis, Cambridge, University Press, 1952).

Another test "in vivo" had been carried out on the rat in a manner analogous to the previous one but without pharmacologically stimulating the peristalsis. Only the slowing of the normal peristalsis by the product under examination was observed (Janssen P.A. et al., J. Pharm. Pharmacol. 9, p. 381, 1957). In this test, only the bolus of charcoal is administered after 60 minutes from the product administration, both by subcutaneous and by oral route. The animals are killed after further two hours. The results obtained of $ED_{50}$ are reported in Table I.

The gastric antisecretory action of the products of the invention has been tested, according to the method of Shay H. et al., Gastroenterology 5, p. 43, 1945, on rats having a ligature of pylorus. The animals were fasted for 36 hours, and administered subcutaneously or orally, with the product under examination, and, after 30 minutes, were laparotomized and subjected to juxta-pyloric ligature. After an additional 4 hours, the animals are killed and the volume of gastric liquid is measured. Table I reports the percentage, in respect to the controls, of the volume reduction of the gastric liquid which has been obtained by administering a "standard" dose of the products. The test has been carried out on 10 subjects.

TABLE I

| Compounds | Antispastic activity ($EC_{50}$ in μg./ml.) | | | | | | | Gastric antisecretory activity—Administration | | | |
|---|---|---|---|---|---|---|---|---|---|---|---|
| | "In vitro" against the spasm caused by— | | | "In vivo" against the peristalsis— | | | | Subcutaneous | | Oral | |
| | | | | Caused by Carbachol | | Normal Administration | | | | | |
| | Acetyl choline chloride | Barium chloride | Histamine dihydrochloride | Subcutaneous | Oral | Subcutaneous | Oral | Dose, mg./kg. | Gastric liquid reduction, percent | Dose, mg./kg. | Gastric liquid reduction, percent |
| Controls | | | | | | | | | 100 | | 100 |
| Phenylcyclohexylacetic ester of 5-hydroxy-2-methylisoquinuclidine oxalate | 0.010 | 0.5 | 1.0 | 1.0 | 5 | 20 | 60 | 2.5 | 24 | 5 | 66 |
| Phenylcyclopentylacetic ester of 5-hydroxy-2-methylisoquinuclidine oxalate | 0.010 | 1.0 | 4.0 | 1.0 | 4 | 20 | 100 | 2.5 | 48 | 5 | 76 |
| Phenylcyclopentylacetic ester of 6-hydroxy-2-methylisoquinuclidine oxalate | 0.010 | 1.0 | 5.0 | 1.0 | 8 | 50 | | 2.5 | 47 | 5 | 68 |
| Benzyl ester of 5-hydroxy-2-methylisoquinuclidine hydrochloride | 0.005 | 10.0 | 0.5 | 0.1 | 5 | 20 | 60 | 2.5 | 19 | 5 | 65 |
| Benzyl ester of 5-hydroxy-2-methylisoquinuclidine iodomethylate | 0.050 | 100.0 | 10.0 | 0.2 | 15 | 90 | 120 | 2.5 | 19 | 5 | 66 |
| Benzyl ester of 6-hydroxy-2-methylisoquinuclidine hydrochloride | 0.001 | 15.0 | 5.0 | 0.4 | 2.5 | 30 | 40 | 2.5 | 25 | 5 | 61 |
| Phenylcyclohexylglycolic ester of 5-hydroxy-2-methylisoquinuclidine hydrochloride | 0.050 | 1.0 | 0.5 | 0.2 | 0.5 | 3 | 3.2 | 2.5 | 19 | 5 | 17 |
| Phenylcyclohexylglycolic ester of 5-hydroxy-2-methylisoquinuclidine iodomethylate | 0.020 | 100.0 | 20.0 | 0.07 | 8.0 | 20 | 50 | 2.5 | 20 | 5 | 68 |
| Phenylcyclohexylglycolic ester of 6-hydroxy-2-methylisoquinuclidine hydrochloride | 0.010 | 5.0 | 2.5 | 0.2 | 1.5 | 2 | 10 | 2.5 | 21 | 5 | 69.7 |
| Atropine sulfate | 0.005 | >100.0 | 10.0 | 0.3 | 3 | 8.2 | 36.3 | 2.5 | 28 | 5 | 68 |
| Oxyphenonium | 0.005 | >100.0 | 10.0 | 0.1 | 0 | 5.1 | 27.3 | 2.5 | 29 | 5 | 69.8 |

The following examples serve to illustrate the invention without limiting the same.

EXAMPLE 1

Phenylcyclohexylacetic ester of 6-hydroxy-2-methylisoquinuclidine hydrochloride 2.450 g. of 6-hydroxy-2-methylisoquinuclidine were dissolved in 20 ml. of pyridine. 6.500 g. of phenylhexylacetylchloride (J. Org. Chem. 26, 1961 p. 1573) dissolved in 20 ml. of anhydrous pyridine were added at room temperature in 15 minutes. The reaction mixture was heated to 70° C. for 15 hours and dried under vacuo. The residue was shaken with diethyl ether and dilute hydrochloric acid until complete dissolution. The ether layer was separated off and the residue was twice extracted with diethyl ether. The acid aqueous part was cooled to 0° and made decidedly basic with a 20% solution of potassium carbonate. The mixture was extracted with diethyl ether. The extracts were washed with distilled water, dried over anhydrous sodium sulfate and evaporated to dryness. The residue was decolored with charcoal and then dissolved in 50 ml. of methylene chloride and acidified to Congo red, with hydrochloric acid in anhydrous ether. The mixture was evaporated to dryness and a foam was obtained, which crystallized from ethanol-diethyl ether and gave 3.600 g. of the product melting at 125° C.

EXAMPLE 2

Phenylcyclohexylacetic ester of 6-hydroxy-2-methylisoquinuclidine iodomethylate

By operating as in Example 1, the phenylcyclohexylacetic ester of 6-hydroxy-2-methyl-isoquinuclidine was obtained. 0.700 g. of this product were dissolved in 15 ml. of nitromethane. To the solution, 1 mg. of methyl iodide was added. The solution was allowed to stand at room temperature of 12 hours. The mixture was evaporated to dryness under vacuo, and the solid residue, recrystallized from ethanol-diethyl ether and gave 0.900 g. of the product melting at 255°–256° C.

EXAMPLE 3

Phenylcyclohexylglycolic ester of 5-hydroxy-2-methyl-isoquinuclidine hydrochloride

In to 7.700 g. of α-chloro-α-phenyl-cyclohexylacetic acid chloride (J. Am. Chem. Soc. 70, 1948, p. 3626) dissolved in 20 ml. of anhydrous pyridine were pourned 2 g. of 5-hydroxy-2-methylisoquinuclidine dissolved in 10 ml. of anhydrous pyridine. The reaction mixture was heated to 50° C. for 15 hours, and then evaporated to dryness under vacuo. The residue was shaken with diethyl ether and diluted hydrochloric acid until complete dissolution. The ether layer was separated and the aqueous layer was twice extracted with diethyl ether. The aqueous layer, cooled to 0° C. was made decidedly basic with 20% potassium carbonate solution and was extracted three times with diethyl ether. The extracts were washed with distilled water and dried over anyhdrous sodium sulfate. By evaporation of the extracts, 4 g. of an oily compound were obtained and then decolored with charcoal. The oily product was converted into the hydrochloride, dissolved in methylene chloride, with gaseous hydrogen chloride in anhydrous ether. The mixture was evaporated to dryness. A foam was obtained and dissolved in 60 ml. of water. The solution was heated to 50° C. and the pH of the solution was maintained at from 5 to 5.5 with small additions of a saturated solution of sodium bicarbonate. When the pH no longer showed significant changes, the solution was cooled to 0° C., made basic with 20% potassium carbonate solution and was extracted with diethyl ether. The extracts were dried over anhydrous sodium sulfate. By evaporating off the ether, an oily product was obtained, which was transformed into the hydrochloride by dissolution in methylene chloride and treating with gaseous hydrogen chloride in anhydrous ether. The mixture was evaporated to dryness and the residue crystallized from ethyl acetate and then from absolute ethanol-diethyl ether. 2.700 g. of the product, melting at 239°–241° C., were obtained.

EXAMPLE 4

Operating as in the previous examples, the following products were obtained:

|  | ° C. |
|---|---|
| Diphenylacetic ester of 5-hydroxy-2-methyl-isoquinuclidine oxalate | 160 |
| Diphenylacetic ester of 5-hydroxy-2-methyl-isoquinuclidine iodomethylate | 188–191 |
| Diphenylacetic ester of 6-hydroxy-2-methyl-isoquinuclidine hydrochloride | 170–172 |
| Diphenylacetic ester of 6-hydroxy-2-methyl-isoquinuclidine iodomethylate | 203–205 |
| Phenylcyclohexylacetic ester of 5-hydroxy-2-methyl-isoquinuclidine oxalate | 157–158 |
| Phenylcyclohexylacetic ester of 5-hydroxy-2-methyl-isoquinuclidine iodomethylate | 221–222 |
| Phenylcyclopentylacetic ester of 5-hydroxy-2-methyl-isoquinuclidine oxalate | 153–155 |
| Phenylcyclopentylacetic ester of 5-hydroxy-2-methyl-isoquinuclidine iodomethylate | 228–230 |
| Phenylcyclopentylacetic ester of 6-hydroxy-2-methyl-isoquinuclidine oxalate | 122–124 |
| Phenylcyclopentylacetic ester of 6-hydroxy-2-methyl-isoquinuclidine iodomethylate | 255–258 |
| Benzilic ester of 5-hydroxy-2-methyl-isoquinuclidine hydrochloride | 161–164 |
| Benzilic ester of 5-hydroxy-2-methyl-isoquinuclidine iodomethylate | 219–221 |
| Benzilic ester of 6-hydroxy-2-methyl-isoquinuclidine hydrochloride | 220 |
| Benzilic ester of 6-hydroxy-2-methyl-isoquinuclidine iodomethylate | 240 |
| Phenylcyclohexylglycolic ester of 5-hydroxy-2-methyl-isoquinuclidine iodomethylate | 210–215 |
| Phenylcyclohexylglycolic ester of 6-hydroxy-2-methyl-isoquinuclidine hydrochloride | 165–170 |
| Phenylcyclohexylglycolic ester of 6-hydroxy-2-methyl-isoquinuclidine iodomethylate | 193–195 |

We claim:
1. Phenylcyclohexylacetic ester of 6-hydroxy-2-methyl-isoquinuclidine hydrochloride.
2. Phenylcyclohexylacetic ester of 6-hydroxy-2-methyl-isoquinuclidine iodomethylate.
3. Phenylcyclohexylglycolic ester of 5-hydroxy-2-methyl-isoquinuclidine hydrochloride.
4. Phenylcyclohexylacetic ester of 5-hydroxy-2-methyl-isoquinuclidine oxalate.
5. Phenylcyclohexylacetic ester of 5-hydroxy-2-methyl-isoquinuclidine iodomethylate.
6. Phenylcyclopentylacetic ester of 5-hydroxy-2-methyl-isoquinuclidine oxalate.
7. Phenylcyclopentylacetic ester of 5-hydroxy-2-methyl-isoquinuclidine iodomethylate.
8. Phenylcyclopentylacetic ester of 6-hydroxy-2-methyl-isoquinuclidine oxalate.
9. Phenylcyclopentylacetic ester of 6-hydroxy-2-methyl-isoquinuclidine iodomethylate.
10. Phenylcyclohexylglycolic ester of 5-hydroxy-2-methyl-isoquinuclidine iodomethylate.
11. Phenylcyclohexylglycolic ester of 6-hydroxy-2-methyl-isoquinuclidine hydrochloride.
12. Phenylcyclohexylglycolic ester of 6-hydroxy-2-methyl-isoquinuclidine iodomethylate.

References Cited

UNITED STATES PATENTS 3,252,981    5/1966    Whitaker _____ 260—292

OTHER REFERENCES

Chem. Abstracts, 61, 9929d (1964), [Mashkovski].

HENRY R. JILES, Primary Examiner

G. T. TODD, Assistant Examiner

U.S. Cl. X.R.

260—293.53; 424—267

PO-1050
(5/69)

UNITED STATES PATENT OFFICE
CERTIFICATE OF CORRECTION

Patent No. 3,709,893      Dated January 9, 1973

Inventor(s) LUIGI BERNARDI, CESARE BERTAZZOLI, TECLA CHIELI and PAOLO MAGGIONI

It is certified that error appears in the above-identified patent and that said Letters Patent are hereby corrected as shown below:

In the heading to the printed specification, line 9, "20,217/69" should read --20,217 A/69--

Signed and sealed this 16th day of April 1974.

(SEAL)
Attest:

EDWARD M. FLETCHER, JR.
Attesting Officer

C. MARSHALL DANN
Commissioner of Patents